(12) United States Patent
O'Brien

(10) Patent No.: US 9,199,830 B2
(45) Date of Patent: Dec. 1, 2015

(54) HOISTING APPARATUS AND METHOD OF USE

(71) Applicant: Tony O'Brien, Saskatoon (CA)

(72) Inventor: Tony O'Brien, Saskatoon (CA)

( * ) Notice: Subject to any disclaimer, the term of this patent is extended or adjusted under 35 U.S.C. 154(b) by 0 days.

(21) Appl. No.: 14/246,198

(22) Filed: Apr. 7, 2014

(65) Prior Publication Data

US 2014/0304965 A1    Oct. 16, 2014

Related U.S. Application Data

(60) Provisional application No. 61/810,546, filed on Apr. 10, 2013.

(51) Int. Cl.
*B66F 7/02* (2006.01)
*B66F 3/08* (2006.01)
*F16L 3/11* (2006.01)

(52) U.S. Cl.
CPC . *B66F 7/025* (2013.01); *B66F 3/08* (2013.01); *F16L 3/11* (2013.01); *Y10T 29/49817* (2015.01)

(58) Field of Classification Search
CPC ............... B66F 3/08; B66F 3/44; B66F 7/02; B66F 7/025
USPC ............................................. 254/30, 85, 98
See application file for complete search history.

(56) References Cited

U.S. PATENT DOCUMENTS

| 2,953,846 | A | * | 9/1960 | Wagner ........................ 29/261 |
| 4,455,013 | A | | 6/1984 | Fischer et al. |
| 4,901,958 | A | | 2/1990 | Kelso |
| 5,102,074 | A | | 4/1992 | Okada |
| 5,439,264 | A | | 8/1995 | Margiottiello |
| 6,916,015 | B2 | | 7/2005 | Andreasson |
| 7,300,036 | B2 | | 11/2007 | Dinius |
| 7,661,915 | B2 | | 2/2010 | Whipple |

* cited by examiner

*Primary Examiner* — Lee D Wilson
*Assistant Examiner* — Jamal Daniel
(74) *Attorney, Agent, or Firm* — Daniel Boudwin; Global Intellectual Property Agency LLC

(57) ABSTRACT

Described is a hoisting apparatus comprising a temporary support that is adapted to be secured to a pair of vertically disposed, permanent threaded rods suspended from a ceiling. A pair of temporary threaded rods extends vertically downward from the temporary support. A permanent support that is desired to be lifted and secured in an elevated position is engaged with the pair of temporary rods, and a pair of lifting mechanisms is connected to the permanent support and engages with the temporary rods. The lifting mechanism is adapted to raise the permanent support along the length of the temporary rods, and as the permanent support is lifted, it comes into contact with the permanent rods. Once the desired height is reached, the permanent support can be secured to the permanent rods. The temporary support, the pair of temporary rods, and the lifting mechanisms can then be disassembled and removed.

8 Claims, 4 Drawing Sheets

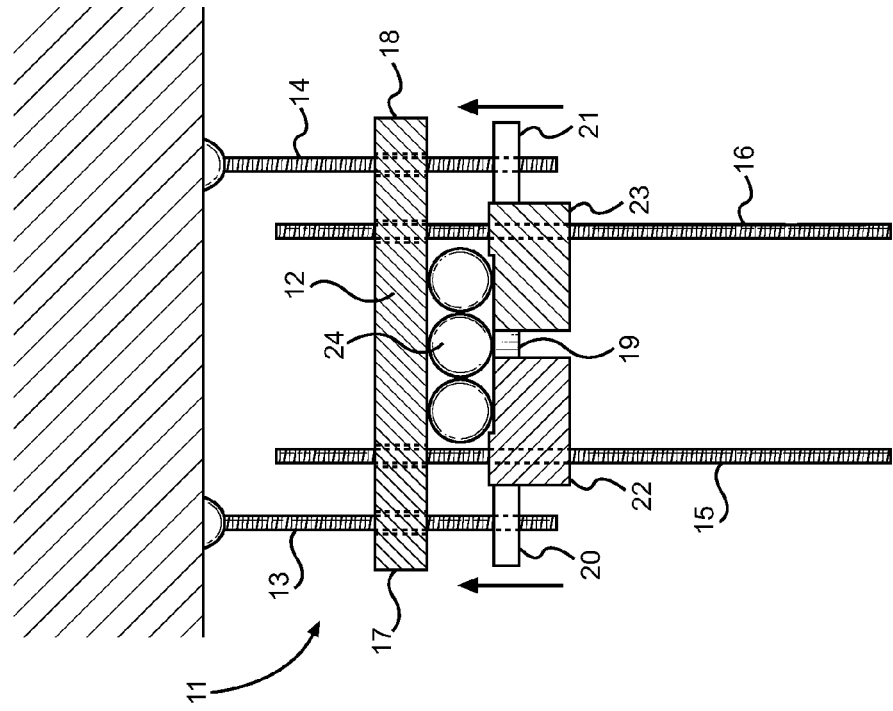
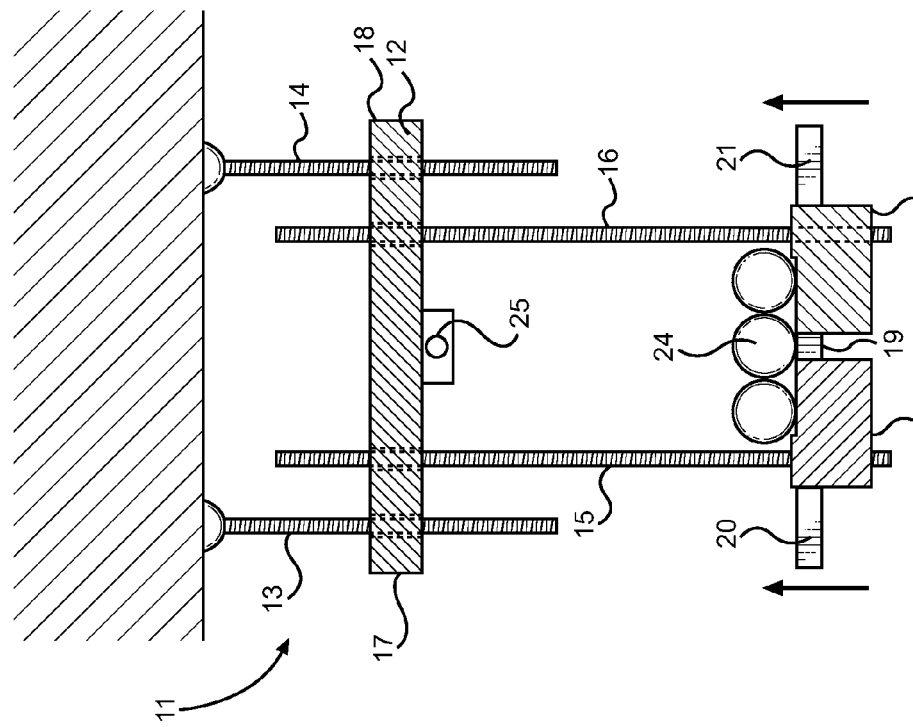

HOISTING APPARATUS AND METHOD OF USE

CROSS REFERENCE TO RELATED APPLICATION

This application claims the benefit of U.S. Provisional Application No. 61/810,546 filed on Apr. 10, 2013. The above identified patent application is herein incorporated by reference in its entirety to provide continuity of disclosure.

BACKGROUND OF THE INVENTION

1. Field of the Invention

The present invention relates to hoisting systems. More specifically, the present invention relates to a hoisting apparatus for overhead piping racks and supports. The hoisting apparatus comprises a temporary support secured to permanent rods suspended from a ceiling. Temporary threaded rods extend vertically downward from the temporary support. A permanent support can be engaged with the temporary rods and with a lifting mechanism that is adapted to raise the permanent support upwards along the length of the temporary rods. Once the permanent support is secured to the permanent rods, the temporary support and temporary rods can be removed.

The construction and renovation of many buildings and factories requires pipes, electric trays, and ventilation ducts to be hoisted and secured to elevated supports. Pipes and other large, heavy objects are often lifted to the necessary height by means of rigging apparatuses. The use of rigging is time consuming and may also pose safety risks to workers using the rigging to raise and secure large, heavy objects to elevated supports. Using rigging systems, pipes are hoisted to high levels, and are then secured to supports by welding or the use of fasteners such as nut and bolts or screws. Once the piping is hoisted to a high-level, workers access the pipes by means of ladders and scaffolding. These devices require workers to maintain awkward positions as they attempt to secure the piping to the support. Due to the danger of working with hoisted piping and vents, many jurisdictions prohibit workers from working below suspended materials.

A hoisting apparatus is disclosed that comprises a horizontally arranged temporary support having a first and second end that is attached to a vertically disposed permanent threaded rod at the first and second end. The apparatus further comprises first and second temporary threaded rods attached to said temporary support and extending vertically downward therefrom. A permanent support to be lifted is connected to said first and second temporary rods at ground level, and a first and second lifting mechanism is attached to said permanent support and engages with said first and second temporary rod. The lifting mechanism is designed to lift the permanent support upwards along the length of the temporary rods. As the permanent support is raised, the permanent support will engage with the first and second permanent rods and can be secured thereto once a desired height is reached. When the permanent support is secured to the first and second permanent rods, the temporary support and the first and second temporary rods can be removed.

2. Description of the Prior Art

Devices have been disclosed in the prior art that relate to lifting mechanisms. These include devices that have been patented and published in patent application publications. These devices generally relate to lifting mechanisms for lifting large objects. The following is a list of devices deemed most relevant to the present disclosure, which are herein described for the purposes of highlighting and differentiating the unique aspects of the present invention, and further highlighting the drawbacks existing in the prior art.

One such device is U.S. Pat. No. 5,439,264 to Margiottiello entitled "Apparatus for Lifting Objects Having a Hollow Cylindrical Core" which discloses a lifting apparatus adapted to lift and move large rolls of paper wound on a cylindrical tube, such as newsprint. The device is a compact structure comprising a sleeve adapted to be inserted into the cylindrical tube of a large roll of paper and having an expandable lower end. Margiottiello discloses a device for lifting rolls of material by means of a probe vertically insertable into the central cylindrical region of the roll, and does not disclose a hoisting apparatus consisting of horizontal supports and vertically disposed rods.

U.S. Pat. No. 7,300,036 to Dinius entitled "Pulley and Hoist Adapter for Bolts All-Thread Rods" discloses an adapter that engages an all thread type rod or a threaded bolt protruding from an elevated position. The adapter further comprises an eyelet from which a pulley may be disposed. The adapter includes a first and second engagement means for engaging a threaded rod, wherein the engagement means are connected to the support member such that the threaded rod is axially aligned between the engagement means. Thus, Dinius does not disclose a hoisting apparatus using lifting mechanisms and vertical supports and instead discloses an eyelet used to support a rope and a pulley.

U.S. Pat. No. 6,916,015 to Andreasson entitled "Lifting Device" discloses a lifting device having a rope provided at a first end with a gripping device adapted to lift an object, a pulling device on a second end of the rope, and a rope wheel around which the rope is wound. The rope wheel comprises a bulge in which a screw is inserted wherein, when the rope is wound on the rope wheel and reaches the bulge, the rope is lifted and interacts with a breaker, such that lifting is stopped. Andreasson discloses a lifting device comprising a rope with gripping means for lifting an object, and a pulling means for pulling the rope. Thus, Andreasson does not disclose a hoisting apparatus comprising a temporary support and temporary rods used to raise a permanent support to an elevated position.

U.S. Pat. No. 4,455,013 to Fischer et al. entitled "Hoist" discloses a braking device for a hoist that prevents the piston of the hoist from being displaced too rapidly. The hoisting device comprises a housing having a sheave set engaged by a rope. A piston and cylinder combination is connected to the sheave set by means of a threaded rod. Thus, Fischer et al. discloses a braking system for a particular type of hoisting apparatus comprising a piston-cylinder arrangement. Fischer et al. does not disclose a lifting apparatus wherein a permanent support and pipe rack are moved upward along the length of vertically disposed threaded rods.

U.S. Pat. No. 4,901,958 to Kelso entitled "Apparatus and Method for Suspending Pipe Rack" discloses a suspended pipe rack apparatus for suspending a pipe rack on vertical, threaded shafts without passing the apparatus over the ends of the shafts. The apparatus comprises vertically opposed U-shaped channel members having transverse slots that are placed laterally on the vertical threaded shafts, and the channel members are secured together in an overlapped position by means of threaded fasteners. Split nuts are used to position the channels at the desired height. Thus, while Kelso discloses a system for suspending pipe racks, Kelso discloses the use of channels having slots allowing the channels to be placed laterally on the threaded shafts such that the channels do not have to be passed over the ends of the shafts. Kelso does not disclose a temporary support or temporary rods for hoisting a pipe rack, and only discloses a device and method for securing pipe rack.

U.S. Pat. No. 5,102,074 to Okada entitled "Supporting Apparatus for Piping, Supporting Instrument for Piping and Retaining Body" discloses a supporting apparatus for piping that allows a user to easily fix the piping to fittings such as anchor bolts to the ceiling of a building. Thus, Okada discloses a particular type of retaining structure, and does not teach a hoisting device or a method of lifting pipes into an elevated position.

U.S. Pat. No. 7,661,915 to Whipple entitled "Trapeze Hanger" discloses an interlocking support hanger that is used to mount horizontal supports from vertical threaded rods. The device includes a pair of support hangers having a center thread that engages with the threaded rods. Further, Whipple discloses a method for suspending a horizontal support assembly from the vertical rods without having to pass the support over the ends of the vertical rods. Whipple does not disclose a hoisting apparatus designed to lift pipes into an elevated position and does not disclose a temporary support structure used to achieve such a purpose.

These prior art devices have several known drawbacks. Several devices known in the prior art disclose support structures on which piping may be arranged and that can easily be installed on threaded rods. However, these devices do not disclose a lifting mechanism for raising the piping and the support into place. Other devices known in the prior art disclose lifting mechanisms but do not focus on a lifting mechanism for raising piping into an elevated position, nor do the references disclose a lifting mechanism comprising a temporary support and temporary rods.

In light of the devices disclosed by the prior art, it is submitted that the present invention substantially diverges in design elements from the prior art and consequently it is clear that there is a need in the art for an improvement to existing hoisting devices. In this regard the instant invention substantially fulfills these needs.

SUMMARY OF THE INVENTION

In view of the foregoing disadvantages inherent in the known types of hoisting devices now present in the prior art, the present invention provides a new hoisting device wherein the same can be utilized for providing convenience for the user when raising vents or pipes into an elevated position.

It is therefore an object of the present invention to provide a new and improved hoisting device that has all of the advantages of the prior art and none of the disadvantages.

It is another object of the present invention to provide a hoisting device that allows a user to secure pipes or vents to a permanent support prior to hoisting the support to an elevated position.

Another object of the present invention is to provide a hoisting device that eliminates the danger of working underneath unsecured pipes or ducts.

Another object of the present invention is to provide a hoisting device comprising a temporary support structure that can be used to raise and secure a permanent support, and that can be easily disassembled after the permanent support is secured.

Yet another object of the present invention is to provide a hoisting device may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 1 shows a view of the hoisting apparatus of the present invention and a permanent rod to be lifted.

FIG. 2A shows a view of the hoisting apparatus of the present invention and a permanent rod partially lifted.

DETAILED DESCRIPTION OF THE INVENTION

Figure 2B:
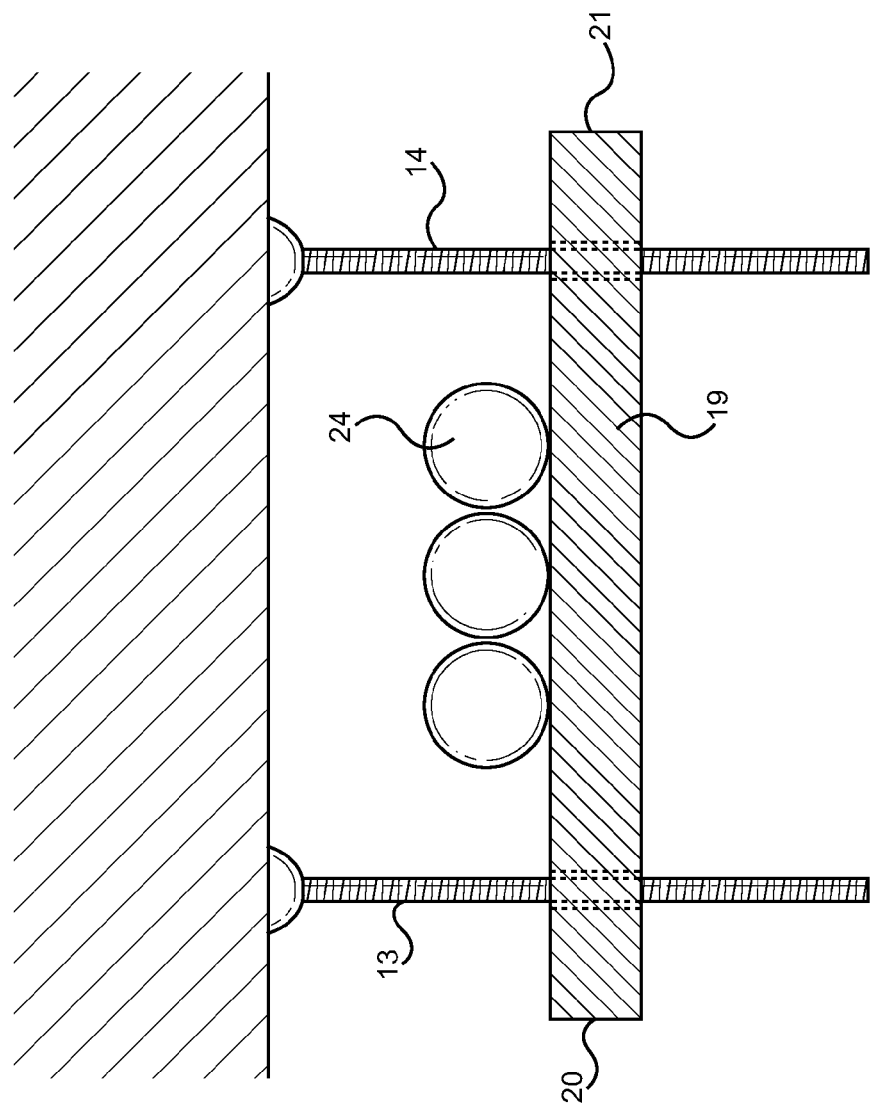
FIG. 2B shows a view of a permanent support secured to permanent ready rods, with the hoisting apparatus removed.

Reference is made herein to the attached drawings. Like reference numerals are used throughout the drawings to depict like or similar elements of the hoisting apparatus. For the purposes of presenting a brief and clear description of the present invention, the preferred embodiment will be discussed as used for lifting a pipe rack to an elevated position. The figures are intended for representative purposes only and should not be considered to be limiting in any respect.

Referring now to FIG. 1, there is shown a view of the hoisting apparatus of the present invention and a permanent rod to be lifted. A temporary support 12 having a first end 17 and a second end 18 is arranged horizontally and is attached at its first and second end 17, 18 to a first permanent rod 13 and a second permanent rod 14, respectively. In some embodiments, the temporary support 12 comprises an eyelet 25 extending downward therefrom such that the temporary support and eyelet can be used with a rigging apparatus. The permanent rods 13, 14 are suspended from a ceiling or other structure and extend vertically downward therefrom. A first temporary rod 15 and a second temporary rod 16 are secured to the temporary support 12 and extend vertically downward therefrom. In a preferred embodiment, the temporary rods and the permanent rods are threaded rods.

A permanent support 19 that is desired to be lifted has a first end 20 and a second end 21 and is arranged horizontally. Piping or ventilating ducts 24 are secured to the permanent support 19 while said support is on ground level. The first end 20 of the permanent support 19 is positioned over the first temporary rod 15, while the second end 21 of the permanent support 19 is positioned over a second temporary rod 16. A first lifting mechanism 22 is secured to the permanent support 19 and engages with the first temporary rod 15, while a second lifting mechanism 23 is secured to the permanent support 19 and engages with the second temporary rod 16. The lifting mechanisms are adapted to raise the permanent support 19 vertically upwards along the lengths of the temporary rods 15, 16. The lifting mechanisms are electromechanically operated and may comprise an actuator such as a hydraulic, pneumatic, or electric actuator.

Referring now to FIGS. 2A and 2B, there are shown views of the hoisting apparatus of the present invention with the permanent support fully raised and with the hoisting apparatus removed, respectively. As the lifting mechanisms 22, 23 raise the permanent support 19 upwards, the permanent support 19 will encounter and engage with the permanent rods 13, 14. Once the permanent support 19 is raised to the desired height, the permanent support 19 can be secured to the permanent rods 13, 14 in the desired fashion. After the permanent support has been secured, the temporary rods 15, 16 and the lifting mechanisms 22, 23 can then be removed from the permanent support 19. Finally, the temporary support 12 can be removed from the permanent rods 13,14 such that the hoisting apparatus of the present invention is completely removed from the permanent support and permanent rods, as shown in FIG. 2B.

Figure 3B:
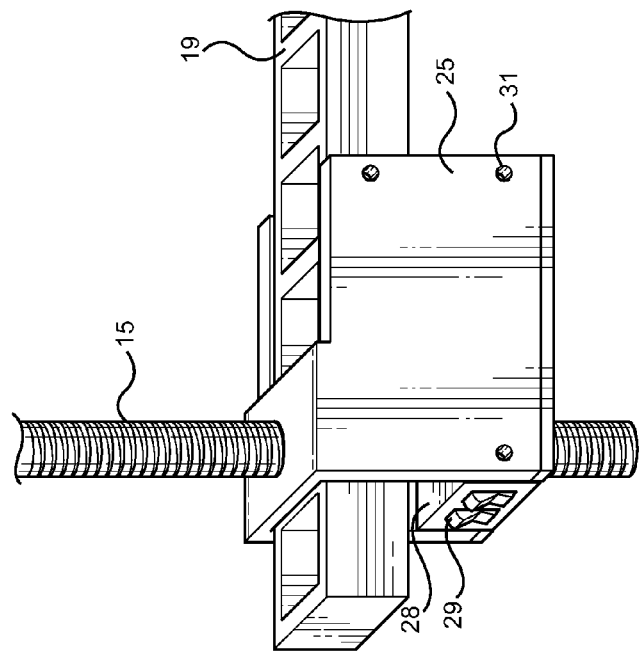
FIG. 3B shows a view of the lifting mechanism assembled and positioned around a support.
Figure 3A:
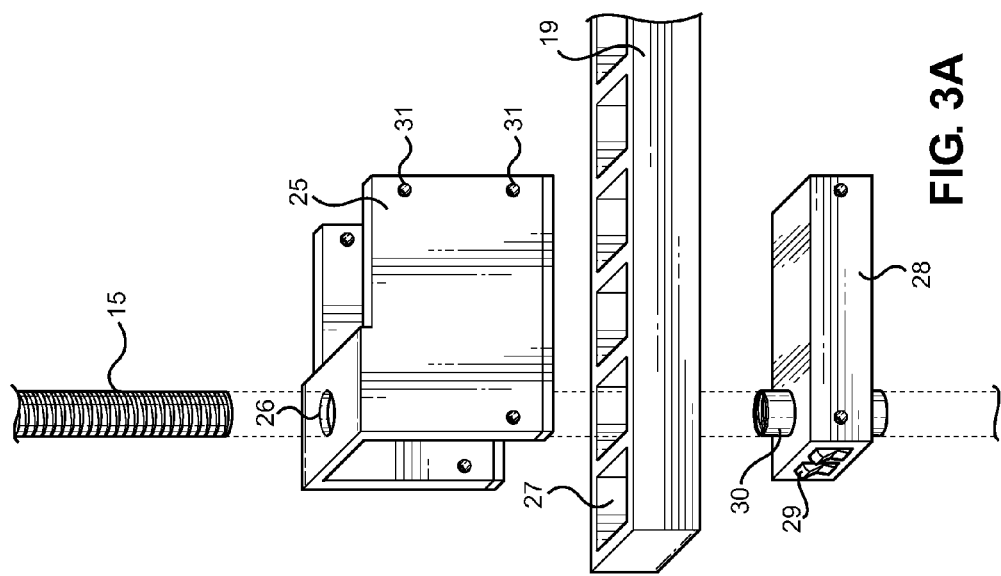
FIG. 3A shows a view of the components of the lifting mechanism positioned for assembly around a support.

Referring now to FIG. 3A, there is shown a view of the lifting mechanism in an unassembled configuration. The lifting mechanism comprises a housing 25 and a lifting device 28, wherein the housing 25 has an aperture 26 through which a temporary rod 15 may be inserted. In operation, the housing 25 is secured over a permanent support 19 and is adapted to enclose a portion of the permanent support therein. The permanent support 19 has a plurality of vertically arranged openings 27 through which a threaded rod 15 can be inserted. The permanent support 19 is positioned within the housing 25 and above a lifting device 28 which comprises one or more controls 29 used to raise or lower the lifting device 28. The lifting device 28 comprises a vertical channel 30 through which a threaded rod 15 can be inserted. The lifting device 28, which is able to move up and down the threaded rod 15 is adapted to raise the permanent rod 19 which is positioned above the lifting device 28.

Referring now to FIG. 3B, there is shown the assembled lifting mechanism with a permanent rod positioned therein. A plurality of screw holes 31 are provided in the housing 25 that are used to secure the housing 25 to the lifting device 28 and also to the permanent support 19. The lifting device 28 moves the permanent support 19 upward along the length of the temporary rod 15. Once the permanent support 19 has been lifted to the desired height, and has been secured in place, the lifting mechanism can be disassembled and the temporary rods can be removed.

Figure 4:
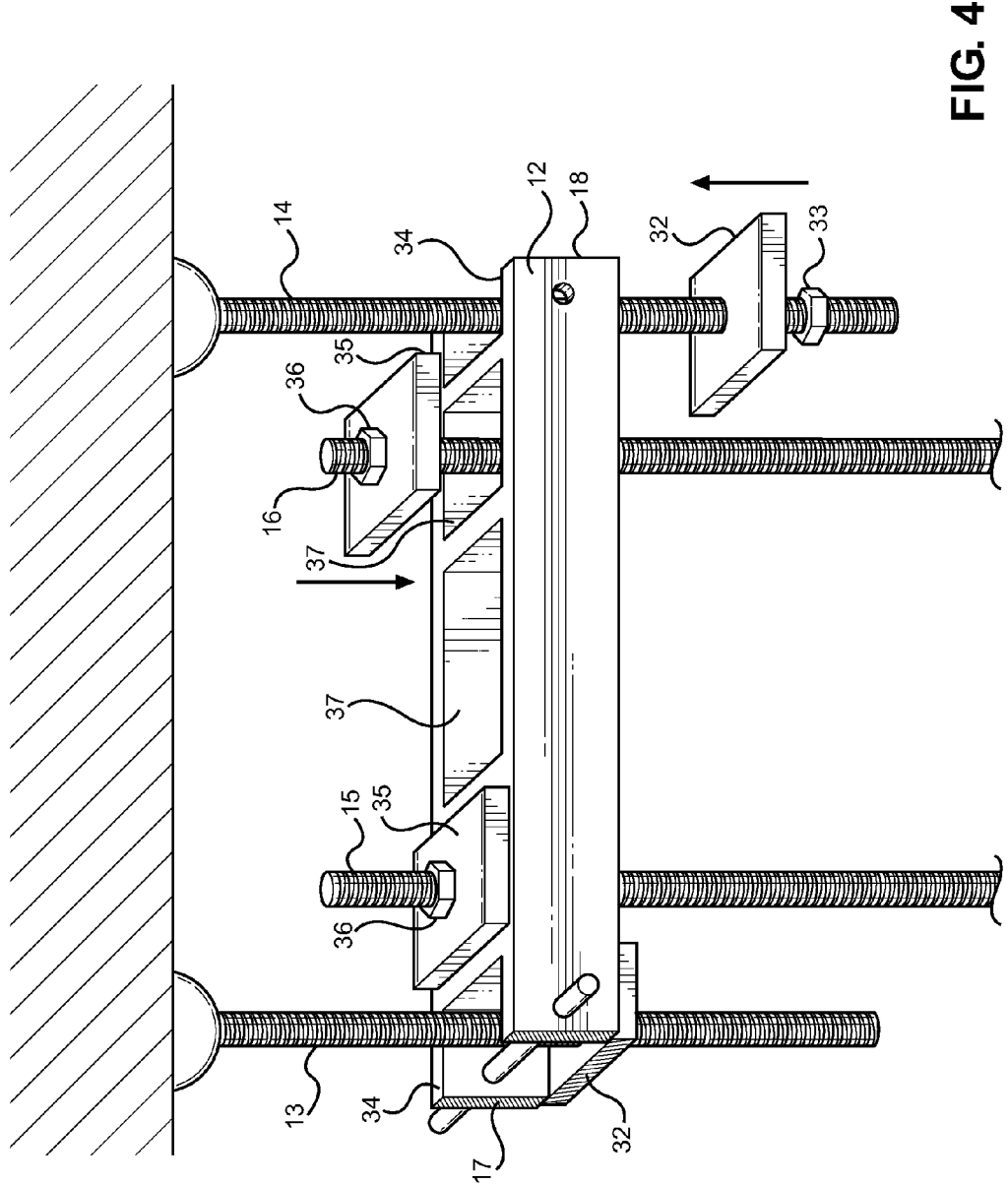
FIG. 4 shows a view of the temporary support and temporary rods of the present invention.

Referring now to FIG. 4, there is shown a view of the temporary support with temporary rods secured thereto. The temporary support 12 of the present invention comprises a U-shaped channel 34 disposed on the first end and the second end. The first and second ends of the temporary support 12 are secured to a first and second permanent rod 13, 14. The temporary support 12 is secured by means of a plate 32 positioned on the permanent rod 13, 14 below the temporary support 12. A threaded nut 33 is secured on the permanent rod 13, 14 below the plate 32. In this way, the temporary support rests on top of the plates 32 which are held in place on top of the nuts 33.

The temporary support further comprises a plurality of apertures extending from the top face of the support to the bottom face of the support. A first and second temporary rod is disposed through the apertures 37 on the temporary support 12. To prevent the temporary rods 15, 16 from falling through the apertures 37 on the temporary support 12, the temporary rods 15, 16 are fitted with a plate 35 that is sized so as to be unable to pass through the aperture 37. The plate 35 is secured in place on top of the temporary support 12 by a threaded nut 36. In this way, the temporary support 12 is secured to the permanent rods 13, 14, and the temporary rods 15, 16 are secured to the temporary support 12. Once the temporary rods are in place, the user may position a permanent support on the temporary rods and install the lifting mechanism.

The present invention describes a hoisting apparatus comprising a horizontally disposed temporary support secured to a pair of permanent threaded rods that extend downward from a ceiling or similar structure. A pair of temporary threaded rods extends downward from the temporary support. A permanent rod can be positioned over the ends of the temporary threaded rods and can be raised upward along the length of the rods by means of a pair of lifting mechanisms secured to the permanent support and that engage with the temporary rods. Once the permanent support has been lifted to a desired height by means of the lifting mechanisms, the permanent support can be secured to the permanent rods. The temporary support, temporary rods, and lifting mechanisms can then be disassembled and removed. In this way, a user can secure piping or ducts on a support prior to lifting the support into an elevated position. The present invention allows a user to easily elevate the secured piping without risk of the piping or other objects falling off of the support, and without needing to secure the pipes to the support once the pipes are lifted to an elevated position.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hoisting apparatus, comprising:
   a temporary support comprising a first end, a second end, a top face, and a bottom face, wherein a plurality of apertures extend from said top face to said bottom face;
   said temporary support adapted to secure to a first permanent rod and a second permanent rod, wherein said first and second permanent rods are connected to a permanent structure;
   a first and a second temporary rod removably securable to said temporary support and extend vertically downward therefrom;
   a permanent support having a first end, a second end, a top face, a bottom face, and a plurality of apertures extending from said top face to said bottom face
   wherein said permanent support is adapted to be disposed horizontally and engage with said first and second temporary rods; and
   a first lifting mechanism and a second lifting mechanism removably connected to said permanent support, and removably engaged with said first and second temporary rod, wherein said first and second lifting mechanism is adapted to raise said permanent support vertically upwards along said first and second temporary rod such that said permanent support is arranged to engage said first and second permanent rods.

2. The hoisting apparatus of claim 1, wherein said temporary support further comprises an eyelet adapted to allow said temporary support to be used as part of a rigging system.

3. The hoisting apparatus of claim 1, wherein said first and second temporary rods are threaded rods.

4. The hoisting apparatus of claim 1, wherein said first and second temporary rods are secured to said temporary support by means of a plate removably secured to each of said first and second temporary rods and sized so as to prevent said plate from passing through said aperture on said temporary rod, wherein said plate is removably secured to said first and second temporary rod by means of one or more nuts.

5. The hoisting apparatus of claim 1, wherein said first and second lifting mechanism each comprises a housing having an aperture adapted to receive a rod, a lifting device having a channel in which a rod may be inserted, wherein a rod is passed through said aperture, through the permanent support, and through said channel.

6. The hoisting apparatus of claim 1, wherein said first lifting mechanism and said second lifting mechanism are electromechanically operated.

7. The hoisting apparatus of claim 1, wherein said first lifting mechanism and said second lifting mechanism each comprise a housing having a channel through which one of said first temporary rod and said second temporary rod can be inserted.

8. A method of hoisting objects, comprising:
securing a temporary support to a first and a second permanent rod, wherein said first and second permanent rod extend vertically downward from a structure;
securing a first and a second temporary rod to a first and second end of said temporary support, respectively;
engaging a permanent support having an object secured thereon to said first and second temporary rod;
securing a first and second lifting mechanism to said permanent support, wherein said lifting mechanism is adapted to engage with said first and second temporary rod;
raising said permanent support along said first and second temporary rod by means of said first and second lifting mechanism;
securing said permanent support to said first and second permanent rod; and
removing said temporary support, said first and second temporary rod, and said first and second lifting mechanism.

* * * * *